US008152147B2

(12) United States Patent
Yang

(10) Patent No.: US 8,152,147 B2
(45) Date of Patent: Apr. 10, 2012

(54) TORSION SPRING ASSEMBLY AND PORTABLE ELECTRONIC DEVICE WITH TORSION SPRING ASSEMBLY

(75) Inventor: Wei-Te Yang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 734 days.

(21) Appl. No.: 12/273,815

(22) Filed: Nov. 19, 2008

(65) Prior Publication Data

US 2009/0273894 A1 Nov. 5, 2009

(30) Foreign Application Priority Data

May 5, 2008 (TW) ............................... 97116489 A

(51) Int. Cl.
*F16F 1/06* (2006.01)
*F16F 1/18* (2006.01)
*F16F 1/12* (2006.01)
*F16F 3/02* (2006.01)
*F16M 11/00* (2006.01)
*G06F 1/16* (2006.01)
*H05K 5/00* (2006.01)
*H05K 7/00* (2006.01)

(52) U.S. Cl. ........ 267/155; 267/157; 267/154; 267/158; 267/166; 267/167; 267/180; 267/168; 267/140.2; 267/141; 267/178; 361/679.21; 361/679.27; 361/679.3; 361/679.55; 361/679.56; 361/679.26; 16/85; 455/575.1

(58) Field of Classification Search .................. 267/155, 267/157, 154, 158, 166, 167, 180, 168, 140.2, 267/141, 178, 179; 361/679.21, 679.27, 361/679.3, 679.55, 679.56, 679.26; 16/85; 455/575.1

See application file for complete search history.

(56) References Cited

U.S. PATENT DOCUMENTS

| 189,153 | A | * | 4/1877 | Towle et al. .................. 251/337 |
| 2,973,805 | A | * | 3/1961 | Rowan .......................... 267/142 |
| 3,939,726 | A | | 2/1976 | Ahrens |
| 4,380,847 | A | * | 4/1983 | Tajima .............................. 16/85 |
| 2006/0180457 | A1 | | 8/2006 | Han et al. |
| 2007/0105606 | A1 | | 5/2007 | Yoon et al. |
| 2007/0252202 | A1 | | 11/2007 | Park et al. |
| 2008/0081505 | A1 | | 4/2008 | Ou et al. |
| 2008/0180892 | A1 | * | 7/2008 | Lai ................................ 361/680 |

FOREIGN PATENT DOCUMENTS

WO WO2007/069552 6/2007

* cited by examiner

*Primary Examiner* — Joanne Silbermann
*Assistant Examiner* — Syed A Islam
(74) *Attorney, Agent, or Firm* — Muncy, Geissler, Olds & Lowe, PLLC

(57) ABSTRACT

A torsion spring assembly includes a torsion spring body and a fixed base. The torsion spring body has a first coil part and a second coil part. The first coil part connects to the second coil part. The fixed base has a first fixed arm and a second fixed arm. The first coil part is wound around the first fixed arm and the second coil part is wound around the second fixed arm. The winding direction of the first coil part is perpendicular to the winding direction of the second coil part. A portable electronic device with the torsion spring assembly is also disclosed.

20 Claims, 9 Drawing Sheets

TORSION SPRING ASSEMBLY AND PORTABLE ELECTRONIC DEVICE WITH TORSION SPRING ASSEMBLY

CROSS REFERENCE TO RELATED APPLICATIONS

This Non-provisional application claims priority under 35 U.S.C. §119(a) on Patent Application No(s). 097116489 filed in Taiwan, Republic of China on May 5, 2008, the entire contents of which are hereby incorporated by reference.

BACKGROUND OF THE INVENTION

1. Field of Invention

The invention relates to a torsion spring assembly and a portable electronic device with a torsion spring assembly.

2. Related Art

Due to the development of the technology, various information products have been developed to make our lives more convenient and shorten the distance between the human beings by fast information transmission. In the present information products, the portable electronic devices, which have small volume and are easily carried, have become more popular. The portable electronic device is, for example, an electronic organizer, a language translator, a cell phone, a smart phone, a personal digital assistant (PDA) or a laptop computer. This kind of portable electronic device has a certain market occupancy ratio, which has grown year by year.

For example, the smart phone includes a display unit and a host unit. The display unit can slide and turn relative to the host unit so as to expose the keypad set. However, in order to have both the sliding and turning functions, the smart phone needs at least two modules, including a sliding module and a turning module. These two modules not only increase the material cost but also increase the manufacturing cost because they must be assembled accurately. In addition, the smart phone needs a larger space to contain these two modules, so that the cost of the smart phone increases. Moreover, when any one of the modules malfunctions, the smart phone can not be normally used.

SUMMARY OF THE INVENTION

An object of the invention is to provide a torsion spring assembly, which can integrate plural desired functions of plural modules.

Another object of the invention is to provide a torsion spring assembly, which is cheaper, and a portable electronic device with the torsion spring assembly.

To achieve the above object, the invention discloses a torsion spring assembly including a torsion spring body and a fixed base. The torsion spring body has a first coil part and a second coil part connected with each other. The fixed base has a first fixed arm and a second fixed arm. The first coil part is wound around the first fixed arm, and the second coil part is wound around the second fixed arm. The winding direction of the first coil part is perpendicular to the winding direction of the second coil part.

In addition, the invention also discloses a portable electronic device including a torsion spring assembly and an electronic device. The torsion spring assembly has a roller and a torsion spring body. The torsion spring body has a first coil part, a second coil part, a first extension part and a second extension part. The first coil part is connected to the second coil part. The first extension part is extended to one end of the first coil part, which is away from a junction of the first coil part and the second coil part. The second extension part is extended to one end of the second coil part, which is away from the connection of the first coil part and the second coil part. The winding direction of the first coil part is perpendicular to the winding direction of the second coil part. The roller is connected to the first extension part. The electronic device has a host unit and a display unit. The first coil part and the first extension part are located at the host unit. The second coil part and the second extension part are located at the display unit. The host has a sliding groove disposed at one side of the host unit. The display unit has a fastener unit disposed corresponding to the sliding groove. The roller rolls within the host unit, and the second extension part is against the display unit. When the fastener element is connected to the sliding groove, the display unit is slidable relative to the host unit between a first position and a second position. When the fastener element is departed from the sliding groove, the second extension part of the torsion spring body turns the display unit with an angle.

As mentioned above, the torsion spring assembly of the invention can integrate the sliding and turning functions so as to reduce the manufacturing cost of the portable electronic device, simplify the assembling procedure, and thus reduce the assembling cost. Moreover, it is easily to achieve the sliding and turning functions by utilizing the torsion spring assembly. Therefore, the assembling cost and the material cost of the invention can be less than that of the conventional sliding module and the turning module. In addition, the required space of the portable electronic device for installing the torsion sparing assembly can be smaller that that for the conventional sliding module and the turning module.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
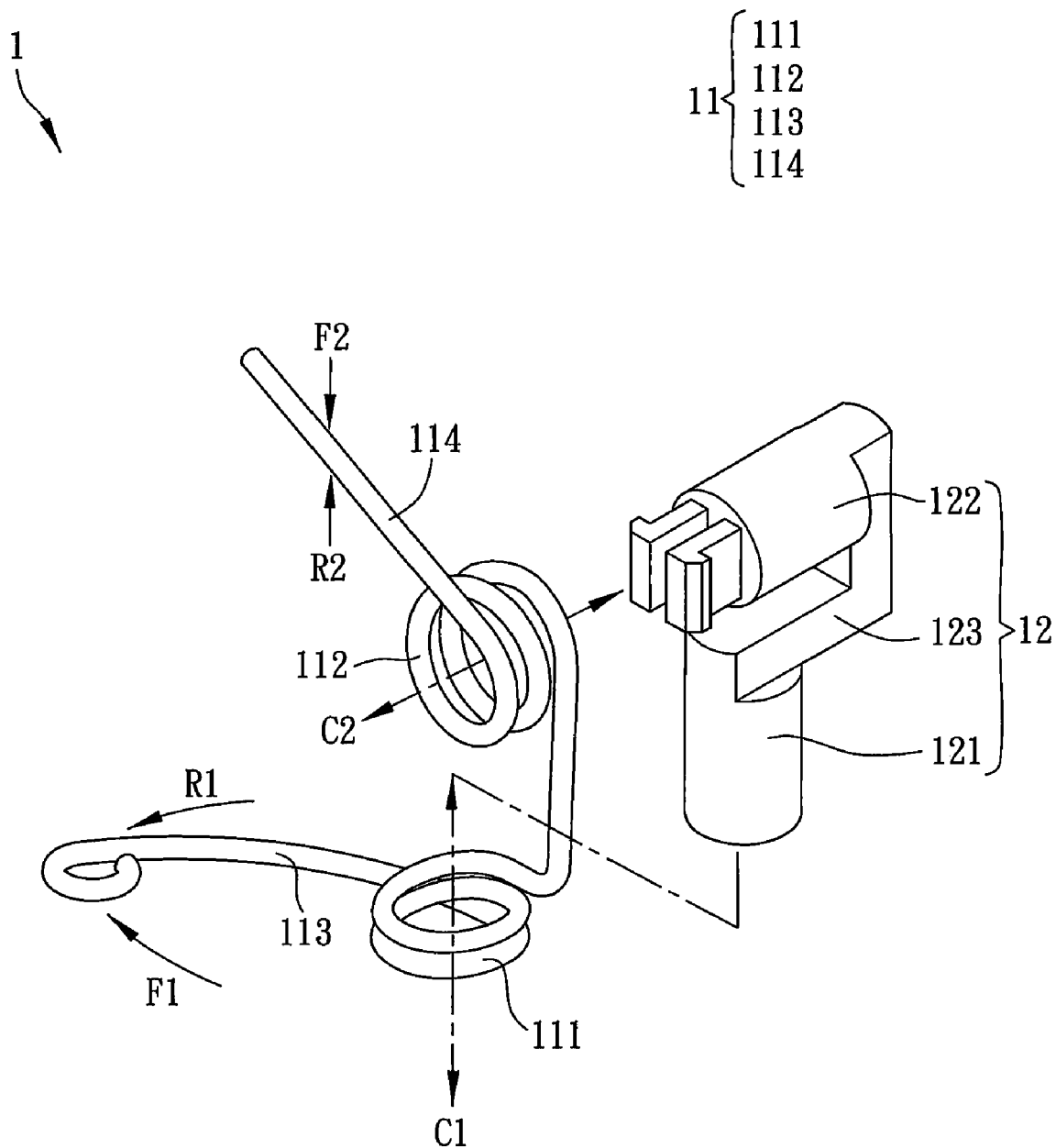
FIG. 1 is a schematic diagram of a torsion spring assembly of the invention.

With reference to FIG. 1, a torsion spring assembly 1 according to an embodiment of the invention includes a torsion spring body 11 and a fixed base 12.

The torsion spring body 11 has a first coil part 111, a second coil part 112, a first extension part 113 and a second extension part 114. In the embodiment, the torsion spring body 11 is formed by winding a single metal wire. Of course, the material of the torsion spring body 11 also can be alloy.

The first coil part 111 is connected to the second coil part 112. The first extension part 113 is extended to one end of the first coil part 111, which is away from the junction of the first coil part 111 and the second coil part 112. The second extension part 114 is extended to one end of the second coil part 112, which is away from the junction of the first coil part 111 and the second coil part 112. In addition, the first coil part 111 is wound along a first winding axis C1 and the winding direction of the first coil part 111 is the same as the first winding axis C1. The second coil part 112 is wound along a second winding axis C2 and the winding direction of the second coil part 112 is the same as the second winding axis C2. In the embodiment, the winding direction of the first coil part 111 is perpendicular to the winding direction of the second coil part 112.

The fixed base 12, which has a first fixed arm 121, a second fixed arm 122 and a connection part 123, can fix the shape of the torsion spring body 11. The extension direction of the first fixed arm 121 is perpendicular to the extension direction of the second fixed arm 122. For example, the extension direction of the first fixed arm 121 is the same as the winding direction of the first coil part 111, and the extension direction of the second fixed arm 122 is the same as the winding direction of the second coil part 112.

The first coil part 111 is wound around the first fixed arm 121 and the second coil part 112 is wound around the second fixed arm 122. The connection part 123 is for connecting the first fixed arm 121 with the second fixed arm 122. One end of the connection part 123 connects to the first fixed arm 121, and the other end of the connection part 123 connects to the second fixed arm 122. The connection part 123 can be L-shaped or I-shaped. In the embodiment, the connection part 123 is L-shaped, for example. The connection part 123 can connect the first fixed arm 121 with the second fixed arm 122 by locking, soldering or screwing. Of course, the first fixed arm 121, the second fixed arm 122 and the connection part 123 also can be integrally formed.

To be noted, the torsion spring body 11 has two coil parts 111, 112 and two extension parts 113, 114. Therefore, the first extension part 113 has a first restoring force R1 and the second extension part 114 has a second restoring force R2 after slewed respectively by a first force F1 and a second force F2, respectively. The first force F1 makes the first extension part 113 turn around the first winding axis C1, and the second force F2 makes the second extension part 114 turn around the second winding axis C2. Thus, the torsion spring body 11 can be slewed. The first restoring force R1 and the second restoring force R2 are the counterforce of the first force F1 and the second force F2. In the embodiment, the direction of the first restoring force R1 is perpendicular to the direction of the second restoring force R2.

The torsion spring assembly 1 is amply disclosed in the above embodiment. Hereinbelow, a portable electronic device with the torsion spring assembly, including how to integrate the torsion spring assembly 1 within the portable electronic device and let the portable electronic device have the sliding and turning functions, will be described.

Figure 2:
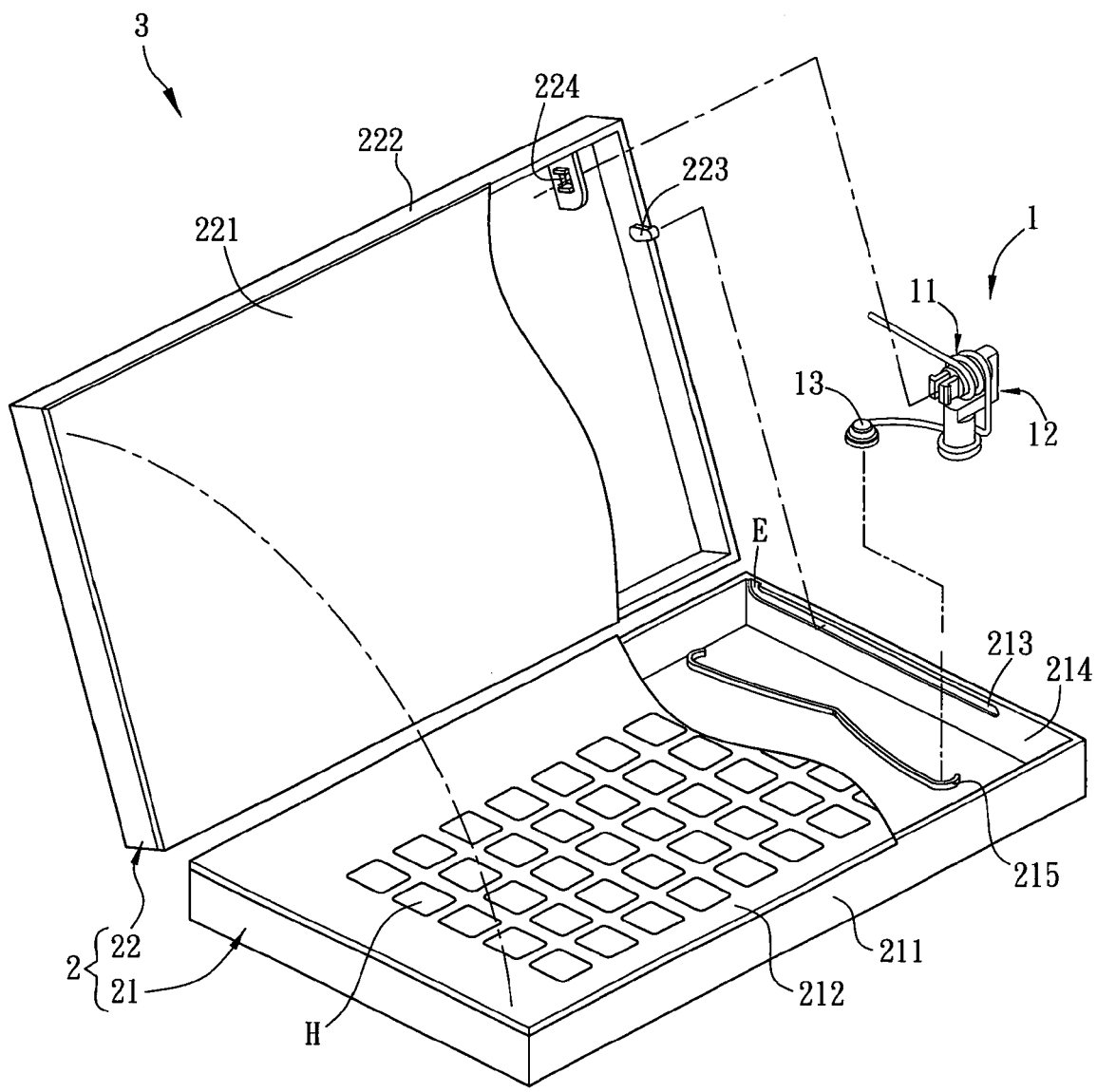
FIG. 2 is a schematic diagram of a portable electronic device of the invention.

As shown in FIG. 2, the portable electronic device 3 according to the embodiment of the invention includes a torsion spring assembly 1 and an electronic device body 2. The portable electronic device 3 can be a cell phone, an electronic organizer, a language translator, a PDA or a laptop computer. In the embodiment, the portable electronic device 3 is a laptop computer.

In the embodiment, the torsion spring assembly 1 has a torsion spring body 11, a fixed base 12 and a roller 13. The roller 13 is connected to the first extension part 113 of the torsion spring assembly 1 (as shown in FIG. 1). The torsion spring body 11 and the fixed base 12 have been described in the above embodiment, so the detailed descriptions will be omitted.

The electronic device body 2 has a host unit 21 and a display unit 22. The host unit 21 has a first housing 211, a second housing 212, a sliding groove 213, a side 214 and a sliding track 215. The first housing 211 is disposed opposite to the second housing 212, and the first housing 211 and the second housing 212 are connected to each other for covering a host circuit board (not shown). The sliding groove 213 is disposed at the side 214 of the host unit 21, such as the internal side of the first housing 211. The sliding track 215 is disposed on the first housing 211. The second housing 212 further has a keypad area H, so that the user can input the instruction through the keypad area H. The display unit 22 has a third housing 221, a fourth housing 222 and a fastener element 223. The third housing 221 is disposed opposite to the fourth housing 222, and the third housing 221 and the fourth housing 222 can connect to each other by locking or screwing.

Figure 3A:
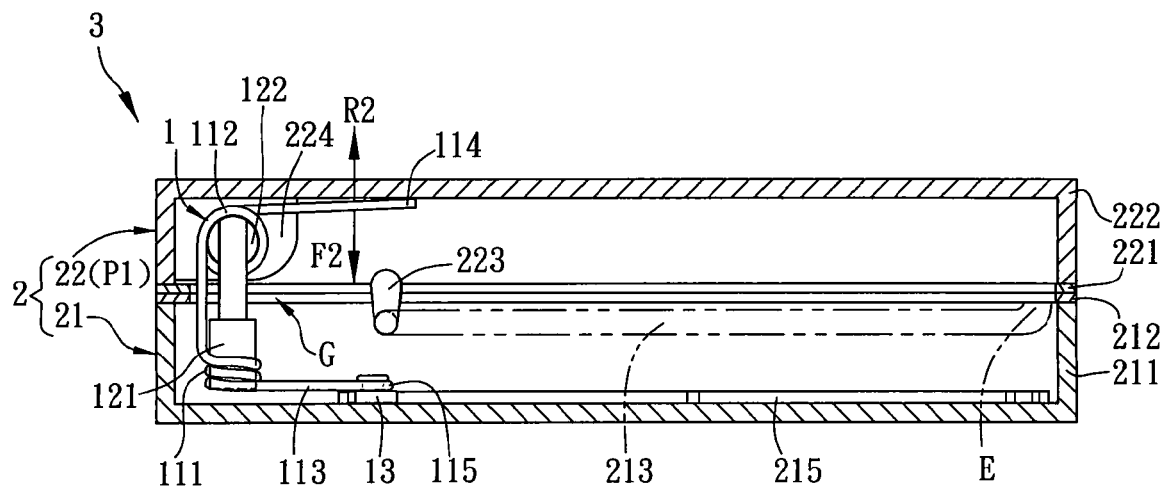
FIGS. 3A and 3B are schematic diagrams of the portable electronic device of the invention, wherein the display unit is located at a first position.
Figure 3B:
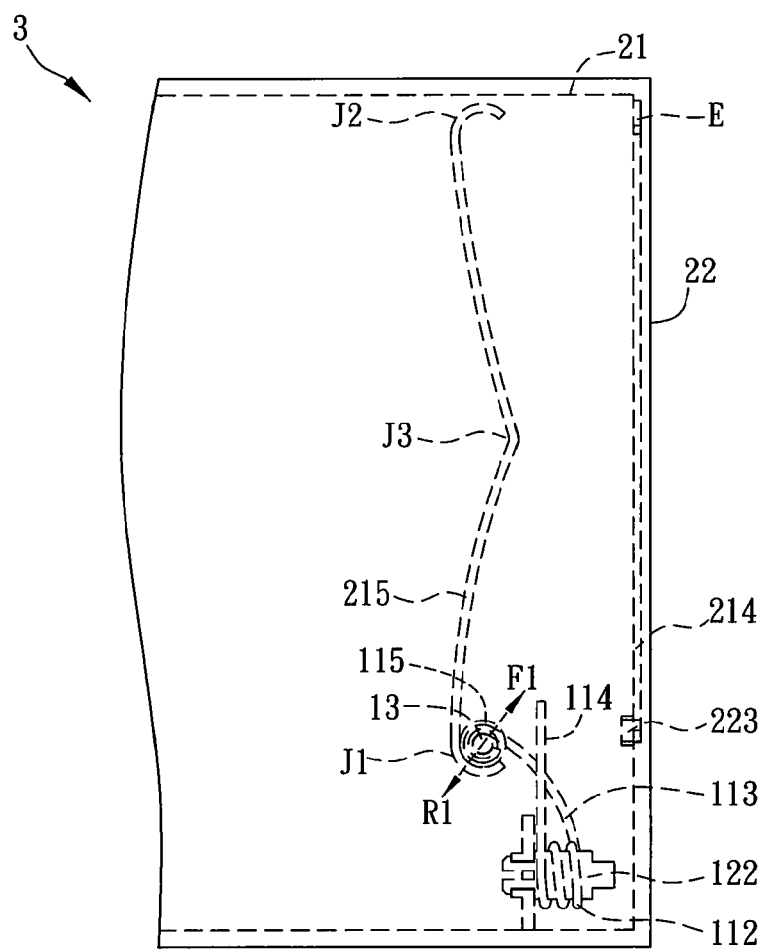

FIG. 3A is a sectional schematic diagram showing the portable electronic device 3 which is closed, and FIG. 3B is a top view of the portable electronic device 3. As show in FIGS. 2, 3A and 3B, the torsion spring assembly 1 connects the host unit 21 to the display unit 22. The first coil part 111 and the first extension part 113 are located at the host unit 21. The first fixed arm 121 of the fixed base 12 is disposed in the host unit 21. That is, the first fixed arm 121 is disposed between the first housing 211 and the second housing 212. The roller 13 rolls in the host unit 21 along the sliding track 215. The second housing 212 further has a rectangular hole G, and at least a part of the torsion spring body 11, such as the second coil part 112 and the second extension part 114, protrudes from the rectangular hole G. Thus, the second coil part 112 and the second extension part 114 can be located in the display unit 22. The fourth housing 222 further has a fixed part 224. In the embodiment, the fixed part 224 is extended from the fourth housing 222 and has a hole. One end of the second fixed arm 122 passes through the hole of the fixed part 224 and connects to the fixed part 224, so that the fixed base 12 can be connected to the display unit 22. In addition, the fastener element 223 of the display unit 22 is disposed opposite to the sliding groove 213. For example, the fastener element 223 can be locked in the sliding groove 213 and slide along the sliding groove 213.

As show in FIG. 3A, when the portable electronic device 3 is closed, the display unit 22 is located at a first position P1 corresponding to the host unit 21, and the display unit 22 stacks with the host unit 21. At this moment, the second extension part 114 of the torsion spring body 11 is forced by the fourth housing 222 (the second force F2) so as to contact against the display unit 22. Therefore, the second extension part 114 has a second restoring force R2. However, the display unit 22 will not be turned by the second restoring force R2 while it is positioned at the first position P1 due to the fastener element 223 of the display unit 22 is fastened with the sliding groove 213 of the host unit 21.

Figure 3C:
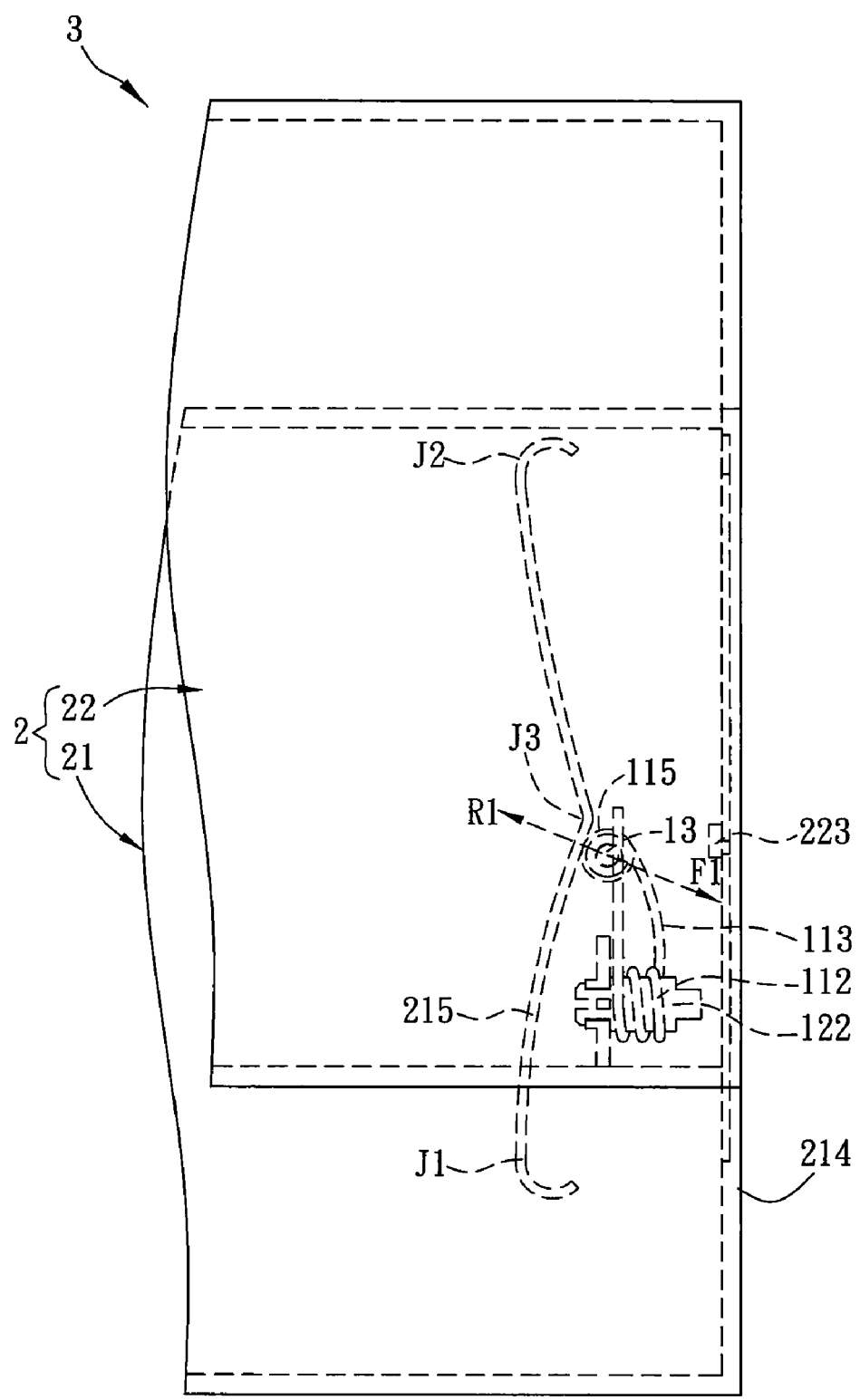
FIG. 3C is a schematic diagram of the portable electronic device of the invention, wherein the display unit slides relative to a host.

FIG. 3C is a schematic diagram showing the display unit 22 sliding with the host unit 21. Referring to FIGS. 3B and 3C, the torsion spring body 11 of the embodiment further has a hook part 115. The first extension part 113 is connected to, for example, sleeve through the roller 13 by the hook part 115.

When the user applies a force to the electronic device body 2 to make the host unit 21 slid relative to the display unit 22, the roller 13 is moved on the sliding track 215. In the embodiment, a distance between a middle part J3 of the sliding track 215 and the side 214 is shorter than a distance between each of the two end parts J1, J2 of the sliding track 215 and the side 214. Therefore, when the roller 13 moves from the end part J1 to the middle part J3, the first extension part 113 of the torsion spring body 11 is pressed (the first force F1) to generate a first restoring force R1 because the relative movement of the sliding track 215 and the roller 13. The first restoring force R1 is increased as the roller 13 moves from the end part J1 to the middle part J3.

Figure 4A:
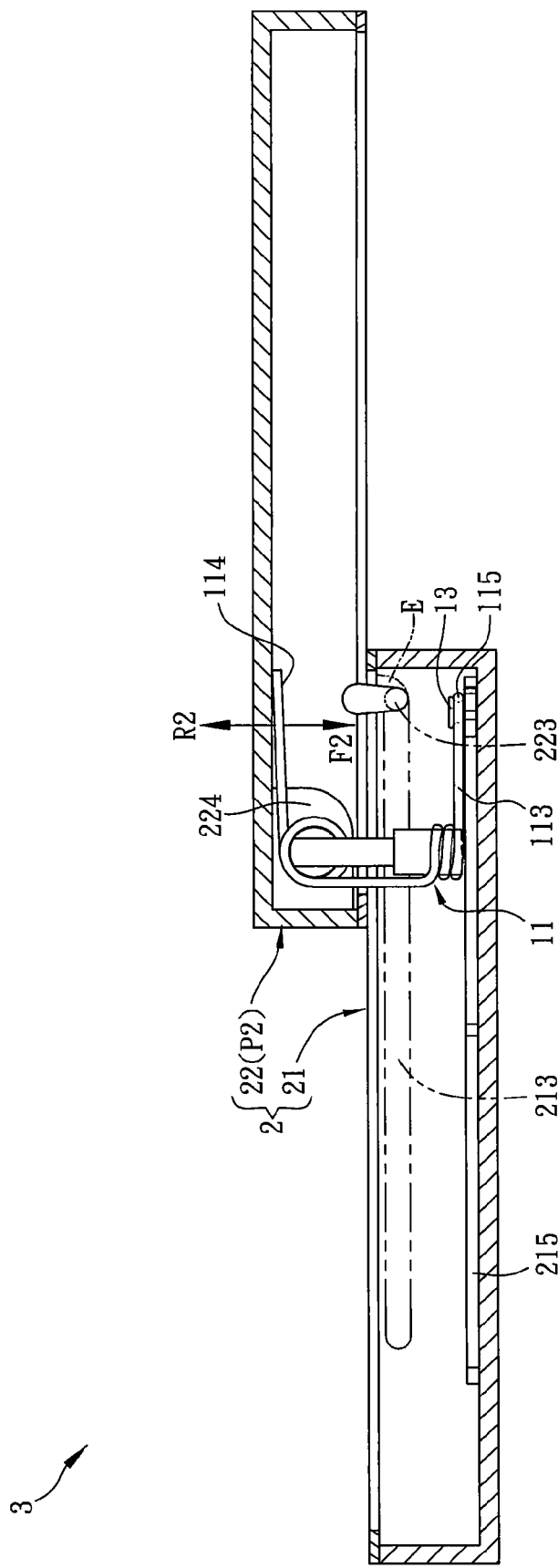
FIGS. 4A and 4B are schematic diagrams of the portable electronic device of the invention, wherein the display unit is located at a second position.
Figure 4B:
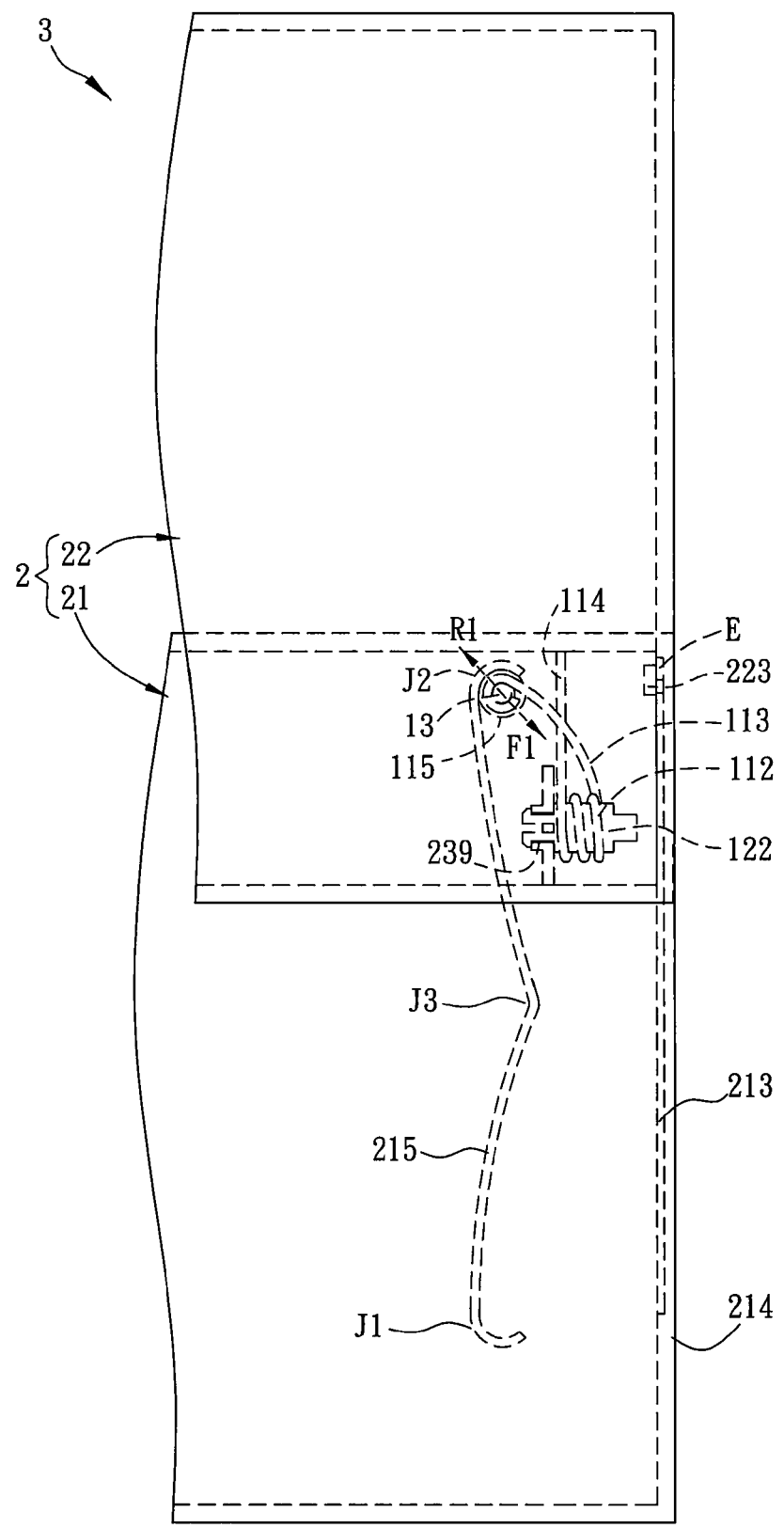

FIG. 4A is a sectional diagram of the portable electronic device 3, wherein the display unit 22 is located at a second position P2. FIG. 4B is a top view of the portable electronic device 3 located at the second position P2. As shown in FIGS. 4A and 4B, the distance between the end part J2 and the side 214 is greater than the distance between the middle part J3 and the side 214. Therefore, during the roller 13 moves along the sliding track 215 from the middle part J3 to the end part J2, the force applied to the first extension part 113 of the torsion spring body 11 is released as the roller 13 moves from the middle part J3 to the end part J2. In other words, the first restoring force R1 is gradually released with the movement of the roller 13 from the middle part J3 to the end part J2.

The release of the first restoring force R1 drives the display unit 22 to slide to the second position P2 automatically, so that a semi-automatic sliding method can be performed. Thus, the operation of the portable electronic device 3 can be more convenient and the user can apply less force to operate it. In more details, the hook part 115 of the torsion spring body 11 is connected to the roller 13 and one end of the second fixed arm 122 is connected to the fixed part 224 so as to connect the fixed base 12 with the display unit 22. Therefore, when the roller 13 moves on the sliding track 215, the roller 13 can drive the torsion spring body 11 and the fixed base 12 to move. In addition, since the fixed base 12 is connected to the display unit 22, the display unit 22 can be moved relative to the host unit 21 when the first restoring force R1 is gradually released with the movement of the roller 13 from the middle part J3 to the end part J2. In other words, the display unit 22 can automatically slide to the second position P2, so that the operation of the portable electronic device 3 can be more convenient and the user can apply less force to operate it.

Figure 5A:
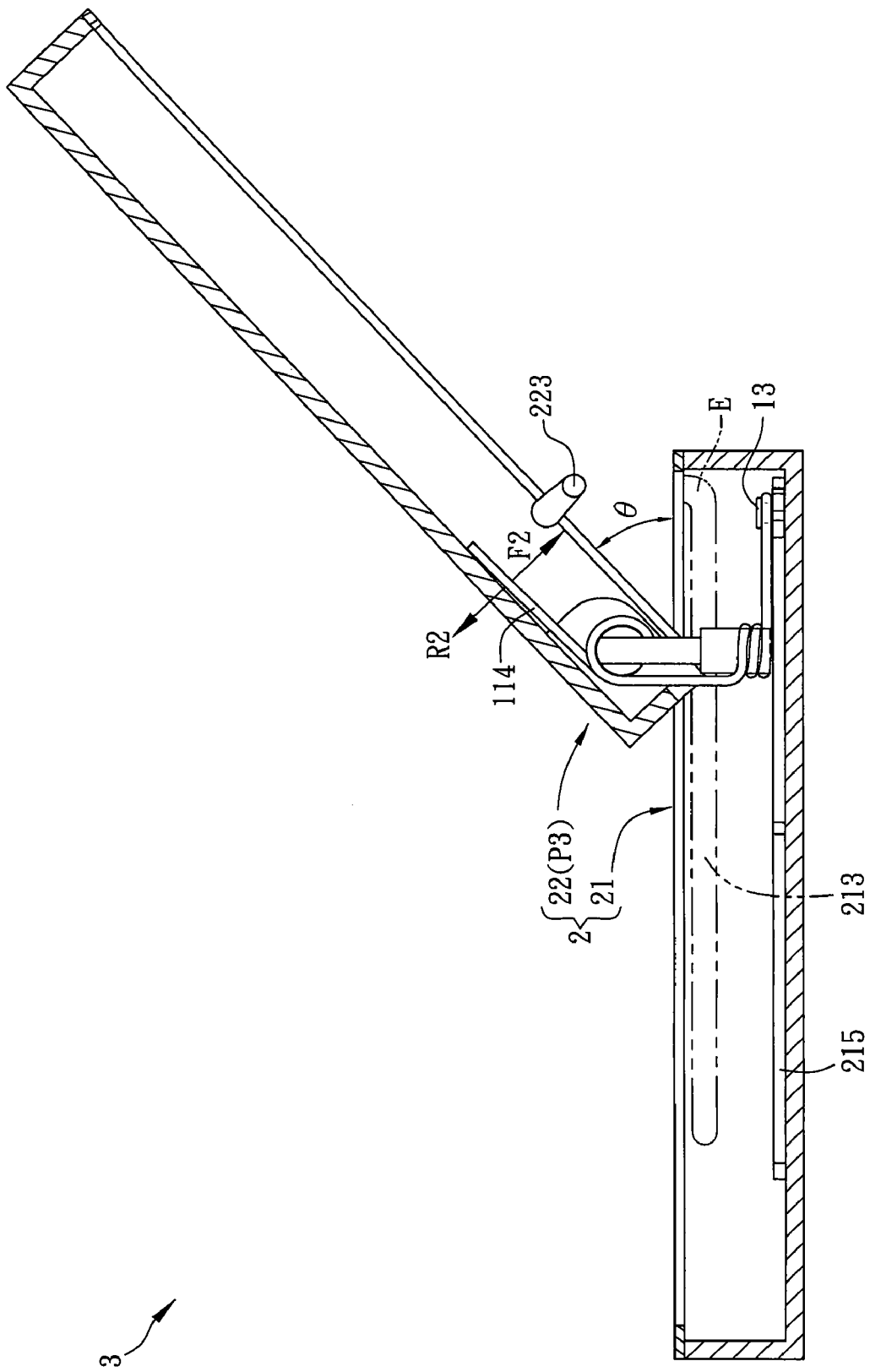
FIGS. 5A and 5B are schematic diagrams of the portable electronic device of the invention, wherein the display unit is located at a third position.
Figure 5B:
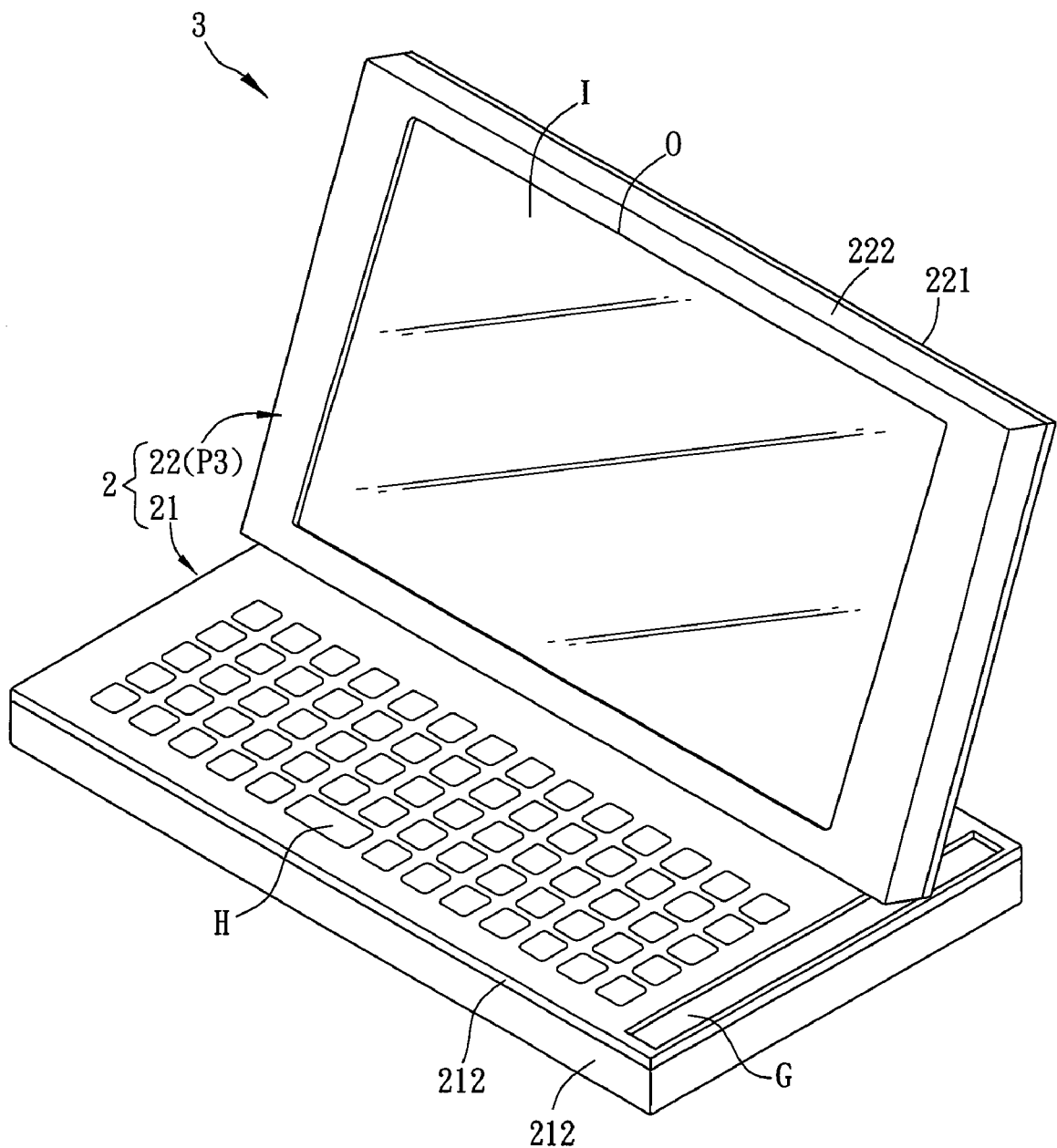

FIGS. 5A and 5B are schematic diagrams showing the display unit 22, which is positioned at a third position P3 after being turned an angle. As shown in FIGS. 3C to 5B, when the display unit 22 is slid relative to the host unit 21, the fastener element 223 is also slid with the display unit 22 (as show in FIG. 3C). One end of the sliding groove 213 has a departing part E. Therefore, when the display unit 22 slides to the second position P2, the fastener element 223 slides to the departing part E of the sliding groove 213 (as show in FIGS. 4B and 4B). At this moment, the fastener element 223 and the sliding groove 213 interfere with each other no more, and the fastener element 223 can be departed from the sliding groove 213 through the departing part E. Therefore, the second extension part 114 can release the second restoring force R2 so as to turn the display unit 22 to the third position P3 automatically (shown as FIG. 5A). In this case, an angle θ is formed between the host unit 21 and the display unit 22. In the embodiment, the fourth housing 222 further has a display panel I (as shown in FIG. 5B). When the display unit 22 is turned to the third position P3, the display panel I can be exposed from an opening O, so that the user can view the display panel I disposed on the fourth housing 222 of the display unit 22.

As show in FIG. 5A, after the portable electronic device 3 is opened, the display unit 22 is located at the third position P3 relative to the host unit 21. When the portable electronic device 3 is to be closed, the user can turn the display unit 22 so that the display unit 22 can be returned to the second position P2. In the second position P2, the display unit 22 is parallel to the host unit 21 (as show in FIG. 4A). Then, the fastener element 223 of the display unit 22 can be fastened with the sliding groove 213 of the host unit 21. The user can continuously force the electronic device body 2 to make the display unit 22 slide with the host unit 21. When the roller 13 drives the first extension part 113 to move from the end part J2 to the middle part J3 (as show in FIG. 4B), the first extension part 113 of the torsion spring body 11 can be forced by the relative movement of the sliding track 215 and the roller 13. Thus, the first extension part 113 can generate the first restoring force R1. Due to the distance between the end part J1 and the side 214 is greater than the distance between the middle part J3 and the side 214, the first restoring force R1 can be released with the movement of the roller 13 from the middle part J3 to the end part J1 after the roller 13 passes through the middle part J3 (as show in FIG. 3C). Then, the display unit 22 can automatically slide to the first position P1 relative to the host unit 21 (as show in FIG. 3A).

Figure 6:
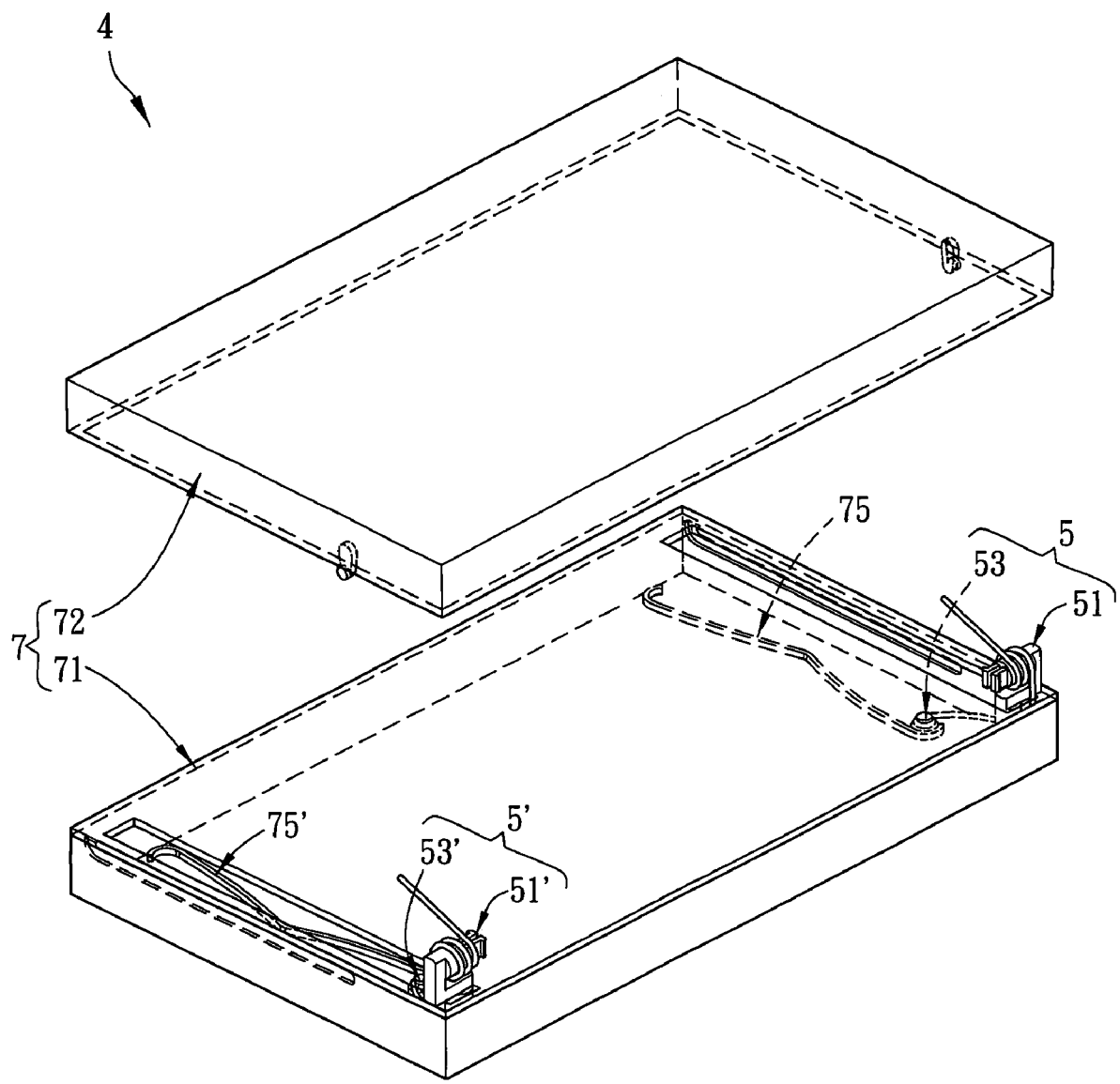
FIG. 6 is a schematic diagram of another portable electronic device of the invention.

As show in FIG. 6, another portable electronic device 4 according to the embodiment of the invention includes two torsion spring assemblies 5, 5' and an electronic device body 7. The torsion spring assembly 5 has a torsion spring body 51 and a roller 53, and the torsion spring assembly 5' has a torsion spring body 51' and a roller 53'. The electronic device body 7 has a host unit 71 and a display unit 72. The host unit 71 has two sliding tracks 75 and 75'. The group of the torsion spring body 51, the roller 53 and the sliding track 75 and the group of the torsion spring body 51', the roller 53' and the sliding track 75' are symmetrically disposed at two side of the host unit 71. The features and functions of the torsion spring assemblies 5, 5' and the electronic device body 7 are the same as the torsion spring assembly 1 and the electronic device body 2 described in the above embodiment, so the detailed descriptions will be omitted.

To sum up, the torsion spring assembly of the invention can integrate the sliding and turning functions so as to reduce the manufacturing cost of the portable electronic device, simplify the assembling procedure, and thus reduce the assembling cost. Moreover, it is easily to achieve the sliding and turning functions by utilizing the torsion spring assembly. Therefore, the assembling cost and the material cost of the invention can be less than that of the conventional sliding module and the turning module. In addition, the required space of the portable electronic device for installing the torsion sparing assembly can be smaller that that for the conventional sliding module and the turning module.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A portable electronic device, comprising:
  a torsion spring assembly having a roller and a torsion spring body, wherein the torsion spring body has a first coil part, a second coil part, a first extension part and a second extension part, the first coil part is connected to the second coil part, the first extension part is extended to one end of the first coil part, which is away from a junction of the first coil part and the second coil part, the second extension part is extended to one end of the second coil part, which is away from the connection of the first coil part and the second coil part, a winding direction of the first coil part is perpendicular to a winding direction of the second coil part, and the roller is connected to the first extension part; and an electronic device having a host unit and a display unit, wherein the first coil part and the first extension part are located at the host unit, the second coil part and the second extension part are located at the display unit, the host has a sliding groove disposed at one side of the host unit, the display unit has a fastener unit disposed corresponding to the sliding groove, the roller rolls within the host unit, and the second extension part is against the display unit;

when the fastener element is connected to the sliding groove, the display unit is slidable relative to the host unit between a first position and a second position, and when the fastener element is departed from the sliding groove, the second extension part of the torsion spring body turns the display unit with an angle.

2. The portable electronic device of claim 1, wherein the torsion spring assembly further comprises a fixed base having a first fixed arm and a second fixed arm, the first coil part is wound around the first fixed arm, and the second coil part is wound around the second fixed arm.

3. The portable electronic device of claim 2, wherein an extension direction of the first fixed arm of the fixed base is perpendicular to an extension direction of the second fixed arm, the extension direction of the first fixed arm is the same as the winding direction of the first coil part, and the extension direction of the second fixed arm is the same as the winding direction of the second coil part.

4. The portable electronic device of claim 2, wherein the fixed base has a connection part, one end of the connection part is connected to the first fixed arm, and another end of the connection part is connected to the second fixed arm.

5. The portable electronic device of claim 1, wherein the first coil part is wound along a first winding axis and the second coil part is wound along a second winding axis.

6. The portable electronic device of claim 1, wherein the first extension part is extended to one end of the first coil part, which is away from a junction of the first coil part and the second coil part.

7. The portable electronic device of claim 1, wherein the second extension part is extended to one end of the second coil part, which is away from a junction of the first coil part and the second coil part.

8. The portable electronic device of claim 5, wherein the first extension part has a first restoring force and the second extension part has a second restoring force after slewed respectively by a first force and a second force, and a direction of the first restoring force is perpendicular to a direction of the second restoring force.

9. The portable electronic device of claim 8, wherein the first force makes the first extension part wound around the first winding axis, and the second force makes the second extension part wound around the second winding axis.

10. The portable electronic device of claim 8, wherein the second restoring force is released when the fastener element departs from the sliding groove, so that the second extension part turns the display unit with the angle.

11. The portable electronic device of claim 1, wherein the host unit further has a first housing and a second housing disposed opposite to each other.

12. The portable electronic device of claim 2, wherein the host unit further has a first housing and a second housing disposed opposite to each other, and the first fixed arm is disposed in the first housing.

13. The portable electronic device of claim 11, wherein the second housing further has a rectangular hole, and at least a part of the torsion spring body passes through the rectangular hole and is disposed in the display unit.

14. The portable electronic device of claim 11, wherein the first housing further has a sliding track, and the roller is slid along the sliding track.

15. The portable electronic device of claim 14, wherein a distance between a middle part of the sliding track and the side of the host unit is shorter than a distance between each end of the sliding track and the side of the host unit.

16. The portable electronic device of claim 15, wherein the first restoring force is larger when the first extension part is located at the middle part of the sliding track, and the first restoring force is smaller when the first extension part is located at the end part of the sliding track.

17. The portable electronic device of claim 1, wherein the display unit further has a third housing and a fourth housing disposed opposite to each other.

18. The portable electronic device of claim 17, wherein the fourth housing further has an opening, and the display unit further has a display panel exposed from the opening.

19. The portable electronic device of claim 1, wherein the torsion spring body further has a hook part, and the first extension part is connected to the roller by the hook part.

20. The portable electronic device of claim 1, wherein the sliding groove further has a departing part located at one end of the sliding groove.

* * * * *